(12) United States Patent
Bennett et al.

(10) Patent No.: US 8,223,967 B2
(45) Date of Patent: Jul. 17, 2012

(54) SECURITY INTEGRATED CIRCUIT

(75) Inventors: Peter Bennett, Bristol (GB); Paul Elliott, Bristol (GB); Andrew Dellow, Minchenhampton (GB)

(73) Assignee: STMicroelectronics Limited, Bristol (GB)

( * ) Notice: Subject to any disclaimer, the term of this patent is extended or adjusted under 35 U.S.C. 154(b) by 963 days.

(21) Appl. No.: 10/575,650

(22) PCT Filed: Oct. 16, 2003

(86) PCT No.: PCT/GB03/04480
§ 371 (c)(1),
(2), (4) Date: Mar. 5, 2007

(87) PCT Pub. No.: WO2005/046233
PCT Pub. Date: May 19, 2005

(65) Prior Publication Data
US 2007/0200960 A1 Aug. 30, 2007

(51) Int. Cl.
*H04N 7/167* (2011.01)
(52) U.S. Cl. ........ 380/227; 725/100; 725/110; 725/146; 725/151
(58) Field of Classification Search .................. None
See application file for complete search history.

(56) References Cited

U.S. PATENT DOCUMENTS

| | | | | |
|---|---|---|---|---|
| 5,999,623 | A * | 12/1999 | Bowman et al. | 380/239 |
| 6,490,356 | B1 * | 12/2002 | Beuque | 380/239 |
| 7,043,020 | B2 * | 5/2006 | Maillard et al. | 380/227 |
| 7,143,294 | B1 * | 11/2006 | Johnson | 713/189 |

FOREIGN PATENT DOCUMENTS

| | | |
|---|---|---|
| DE | 19513042 A1 | 10/1996 |
| DE | 19747058 A1 | 4/1999 |
| EP | 0428252 A2 | 5/1991 |
| EP | 1333350 A1 | 8/2003 |
| EP | 1353511 A2 | 10/2003 |
| JP | 2003-281359 A | 10/2003 |

OTHER PUBLICATIONS

Perr, C.D., "Security and Addressability for Pay-TV," The Video Revolution: Future Developments in Television Transmission and Reception, Video Recording and Replay Technology, Jul. 12-15, 1982, pp. 102-110.

* cited by examiner

*Primary Examiner* — Kaveh Abrishamkar
(74) *Attorney, Agent, or Firm* — Seed IP Law Group PLLC (57) ABSTRACT

A semiconductor integrated circuit for the processing of conditional access television signals that includes an input interface for receiving encrypted television signals and an output interface for output of decrypted television signals. The semiconductor integrated circuit is provided with some functionality restricted in some way by preventing one or more hardware circuit elements from operating, such as an MPEG decoder, display engine, IO ports or main CPU. To enable the functionality, a subscriber must pay for a service and then receives an encrypted message broadcast to the semiconductor integrated circuit that is decrypted and instructs functionality to be turned on or off.

29 Claims, 4 Drawing Sheets

SECURITY INTEGRATED CIRCUIT

BACKGROUND OF THE INVENTION

1. Field of the Invention

The present invention relates to an integrated circuit for processing received transmitted signals and, in particular, to broadcast signals such as television.

2. Description of the Related Art

A wide variety of techniques for broadcast transmission are known in which the broadcast signal is encoded, scrambled or encrypted in some way to allow only authorized recipients to retrieve the original signal. One particular field in which this area has been researched is broadcast television.

The broadcast of television signals in which only permitted or authorized recipients can produce the clear television picture from those signals is known as Conditional Access Television or Pay-TV. In this context, broadcast can include over-air, via satellite, by cable or indeed any appropriate distribution medium in which the same signal content is sent to many recipients. Television signals may be analog signals or digital signals. The term "scrambling" is often used for the process of rendering analog signals unusable until "descrambled", whereas the terms "encryption" and "decryption" are more often used for digital signals. In either case, the aim is to only allow users that have paid a subscription to descramble or decrypt the signals. The terms decoder and decoding will be used herein to cover both analog and digital devices and processes.

Figure 1:
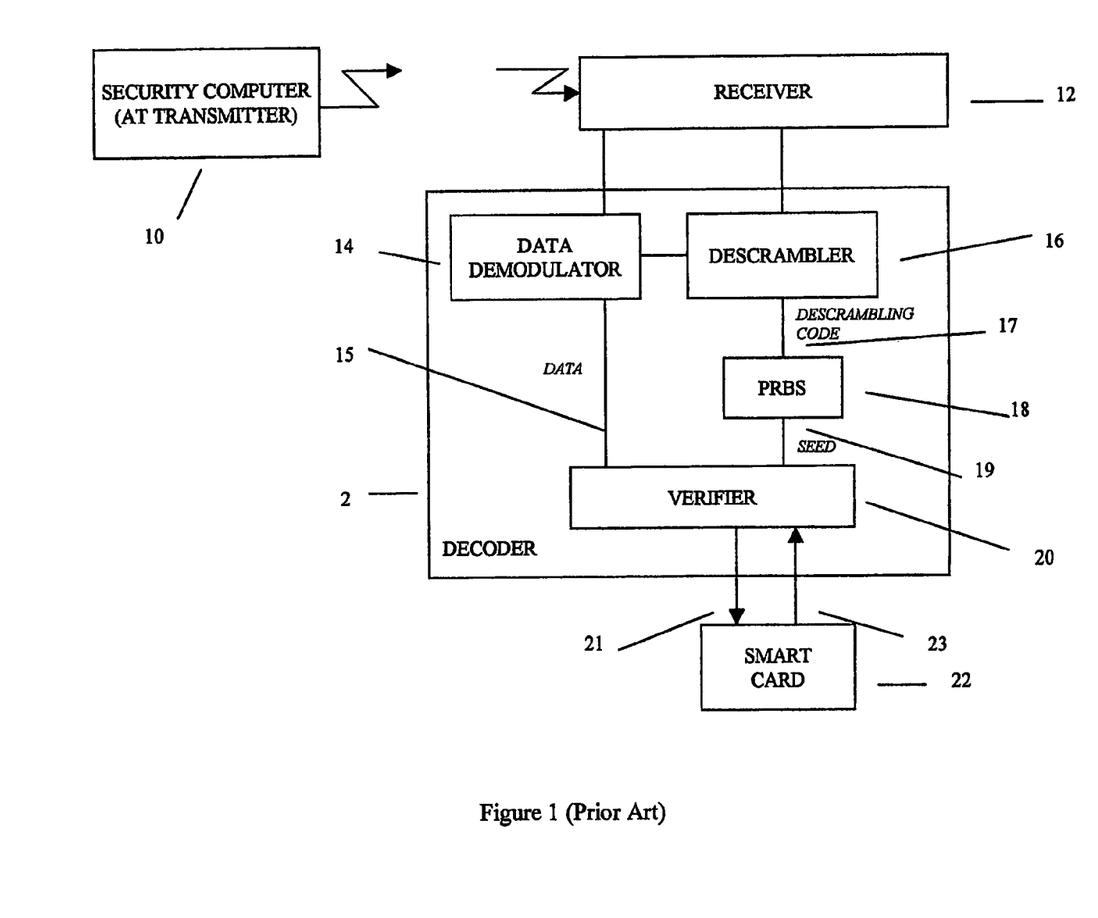
FIG. 1 shows a known receiver and decoder arrangement.

A known system and receiver for processing received signals is described in EP 0,428,252 which is illustrated in FIG. 1. The concept in this system is to broadcast signals in the air (by satellite) which can be received by anyone but only rendered usable by recipients having a "set-top box" decoder 2 and an associated smart card 22. The decoders 2 of all recipients are identical, but the smart cards 22 contain unique encrypted or secret information, including entitlements, which specify the channels within the broadcast signals the user is permitted to watch. The system operates broadly as follows:

A television signal is broadcast over air in a scrambled form and includes a stream of control data describing how the television signal is to be descrambled. The television signals and control data are necessarily the same signal sent to all users. It is not feasible to send the signals uniquely scrambled/encrypted to each recipient as there may be tens of millions of users and this would require tens of millions of times the bandwidth. Accordingly, all recipients must be able to operate the same descrambling/decryption process. This is implemented in the decoder 2, which receives the broadcast signals from a receiver 12. A data demodulator 14 extracts the portion of the signal for picture and/or sound and provides this to a descrambler 16 for descrambling. The control data portion is extracted and provided to a verifier 20 over the line 15. The control data comprises encrypted control words, which are needed to instruct the descrambler how to descramble the picture/sound signal. The control words must therefore be decrypted, and it is for this purpose that the smart card 22 is provided.

The verifier 20 provides encrypted control words across an interface along line 21 to the smart card 22. The smart card 22 contains an algorithm, which, if the user is entitled to watch the chosen channel, decrypts the control words and provides them to the verifier 20 via line 23. The verifier passes the decrypted control words to a PRBS 18, which in turn provides a descrambling code to the descrambler. It should be noted that the control words and hence the descrambling code change frequently (every few seconds). The security in this arrangement is thus that it is not feasible to try and decrypt the control words in real time without the smart card algorithm. Also, in the event that the smart card algorithm is compromised, then the smart cards themselves can be re-issued to all subscribers. Lastly, to view any channels, a user must pay for "entitlements" which are broadcast the over air and are addressed uniquely to each user and stored in the smart card 22.

A second published system is disclosed in a paper "Security and Addressability for Pay-TV" given at The Video Revolution Conference July 1982, University of Reading. In this system, it is proposed that a monthly key is broadcast to each subscriber using each subscriber's unique unit key stored in a decoder. In turn the monthly key, which is common to all users of the system is used to decrypt a program key for decrypting a given television program.

BRIEF SUMMARY OF THE INVENTION

There are security problems with known conditional access broadcast techniques. In the existing smart card approach, a "set-top box" could be purchased and fraudulently used by inserting a smart card that has been modified in some unauthorized way.

Therefore, a need exists for a mechanism to prevent unauthorized use of a semiconductor integrated circuit, in particular one used in a "set-top box".

The disclosed embodiments of the invention have the advantage that a content decoder such as a "set-top box" can be sold in a state that is unusable or only partially useable until enabled by a service provider.

The disclosed embodiments of the invention all share the common concept that some functionality of a semiconductor integrated circuit is permitted or denied by way of a secure message. This allows a device such as a content decoder to selectively have full or only partial functionality in some respect until enabled by a received secure message. The term "enabled" is used in the sense that some hardware functionality of the circuit is restricted until operation is permitted by some form of hardware switch. This can be contrasted to known devices in which access to a service is permitted by the input of a secret key. This concept may be used in conjunction with the embodiments of the invention, but differs in that such known devices permit or deny access to encoded data content, whereas the present embodiments permit, deny, or restrict access to hardware functionality.

Using the embodiments of the invention also permits a new business model to be created. A device such as an audio-video decoder can be sold at a price subsidized by a content provider, but the device may only be partially useable until enabled by provision of a secret message from a service provider. To obtain access to further functionality of the decoder, the user must subscribe to that functionality by paying a subscription to a service provider who then provides the secret message to allow the decoder to provide the functionality.

In accordance with one embodiment of the invention, a semiconductor integrated circuit for use in an audio-video device arranged to produce audio-video signals is provided. The circuit includes an input interface for receipt of a received encrypted enable signal; an output interface for output of audio-video signals; one or more hardware circuit portions each arranged to process data in relation to the audio-video signals; a decryption circuit arranged to receive the encrypted enable signal and to decrypt the encrypted enable signal in accordance with a key to provide a plain text message; a store containing a stored value for the circuit; an enabling circuit arranged to selectively restrict, deny, or allow operation of at least one of the one or more hardware circuit portions; and a comparison circuit arranged to compare the plain text message with the stored value and to selectively instruct the enabling device if the plain text message and stored value match.

In accordance with another aspect of the foregoing embodiment, the enabling circuit includes one or more switch elements arranged to selectively interrupt a data pathway to, from, or within at least one of the one or more hardware circuit portions. Preferably the data pathway is a critical data pathway, and interruption of the pathway prevents operation of the at least one of the one or more hardware circuit portions.

In accordance with another aspect of the foregoing embodiment, the data pathway relates to a clock of one or more hardware circuit portions whereby interruption of the data pathway causes the clock to run slower than normal. The one or more hardware circuit portions can include a CPU, a display engine, a semiconductor integrated circuit having a data port whose operation is prevented or controlled.

In accordance with another aspect of the foregoing embodiment, the enabling circuit is arranged to extract from the plain text message indications of which hardware circuit elements should be restricted, denied, or allowed to operate.

In accordance with another embodiment of the invention, a method of providing an audio-video device to a user, the audio-video device being of the type for manipulation and presentation of audio-video content and having a plurality of hardware circuit portions on a monolithic semiconductor circuit and an input interface. The method includes supplying the audio video device for an end user in a condition that one or more of the hardware circuit portions are inoperable or have reduced functionality; arranging a subscription agreement with the end user in which the user pays for ongoing functionality of the one or more hardware circuit portions; and providing an enable message in encrypted form for input to the input interface, the enable message instructing the monolithic semiconductor circuit to enable functionality of one of the one or more hardware circuit portions.

In accordance with another embodiment of the invention, a circuit is provided that includes a decryption circuit adapted to decrypt an encrypted enable signal in accordance with a key to output a plain text message; and a comparison circuit adapted to compare the plain text message with a stored value and selectively output a control signal if the plain text message matches the stored value.

In accordance with another embodiment of the invention, a method is provided for controlling a circuit, the method includes decrypting an encrypted enable signal in accordance with a key to output a plain text message; and comparing the plain text message with a stored value and selectively outputting a control signal if the plain text message matches the stored value.

In accordance with another aspect of the foregoing embodiments, the enabling circuit is adapted to selectively enable, disable, and restrict operation of at least one other circuit in response to the control signal and to select which of a plurality of other circuits to selectively enable, disable, and restrict operation in response to the plain text message.

BRIEF DESCRIPTION OF THE SEVERAL VIEWS OF THE DRAWINGS

An embodiment of the invention will now be described by way of example only with reference to the Figures, in which.

DETAILED DESCRIPTION OF THE INVENTION

The invention may be embodied in a number of ways, but the preferred embodiments now described are monolithic semiconductor circuits for provision of security. Preferably, the disclosed embodiments are for use in devices for decoding (decrypting or descrambling) television signals, such as "set-top boxes". However, it is to be understood that the present invention will have use in other applications.

The term "set-top box" is well understood to refer to a television decoder, which is used to provide conditional access to television signals by decoding using some form of secret decoding scheme. The invention is particularly applicable to such devices but, naturally, covers decoders which form part of a television set or, indeed, another device such as a hard disk recorder, DVD recorder, radio, or any audio, visual, or multimedia device that provides data content to a user. The data content is the audio and video data, which is received and decoded, to be presented to a user. The preferred embodiment that will now be described is a semiconductor integrated circuit within a television decoder.

There are two alternative arrangements in the preferred embodiment of the invention: (i) to enable a semiconductor circuit once only, using an enabling signal, and (ii) to allow re-enabling of a semiconductor circuit by using an enabling signal to reset a store. These will be described as a single embodiment. Within the single embodiment there are various alternatives of the manner and type of functionality controlled.

Figure 2:
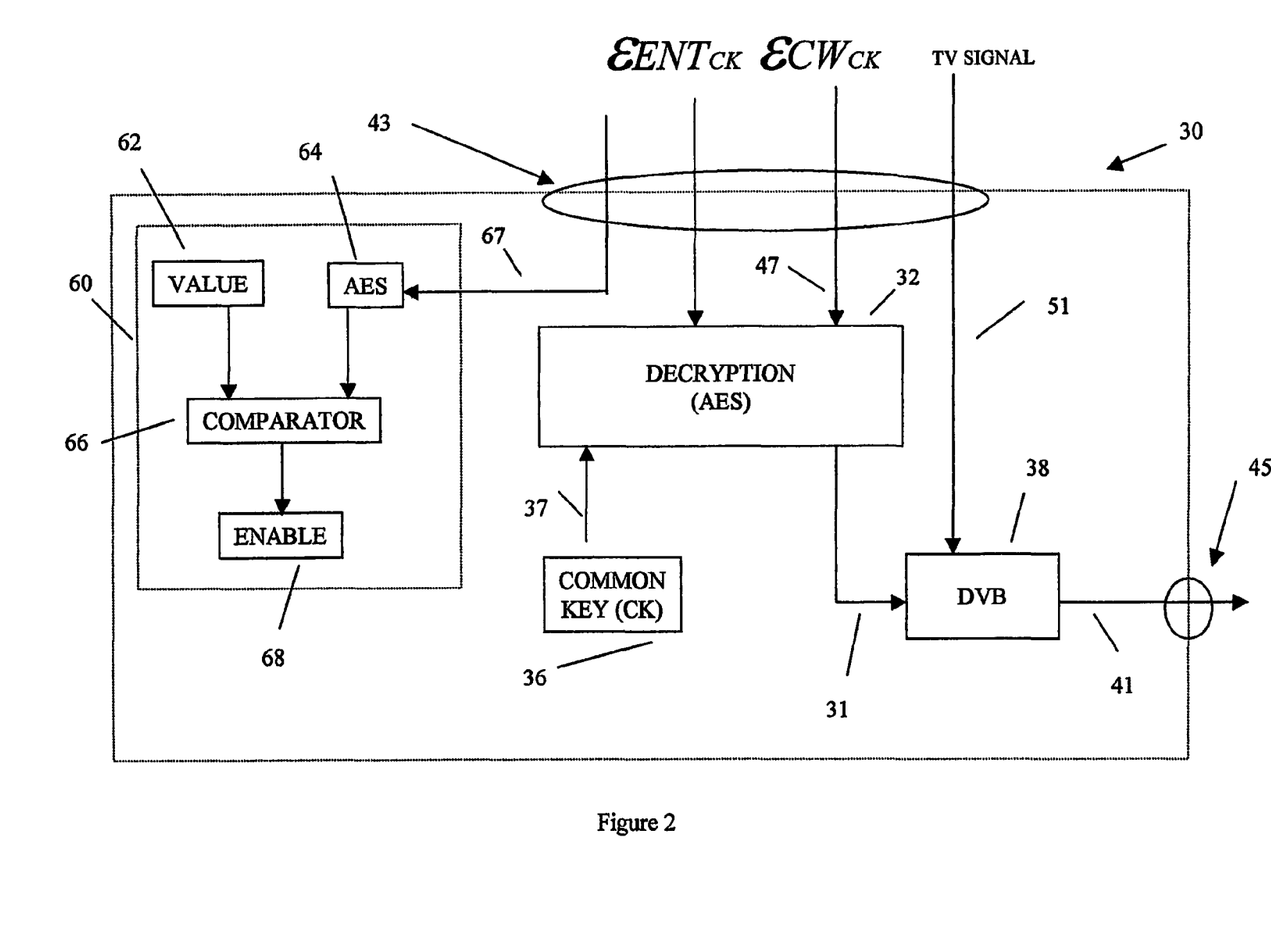
FIG. 2 shows the main functional components of a circuit according to a first embodiment of the invention.

A semiconductor integrated circuit 30 according to the preferred embodiment of the invention is shown in FIG. 2. In this embodiment, of importance is that the circuit 30 is a monolithic device in the sense that it is implemented as a single chip with the result that the internal bus connections shown are not available to exterior devices. It is not possible, therefore, for a hacker to compromise the security of the arrangement by simply reading the signals on any of the internal buses or to write data without using an input interface. The external connections are at input interface 43, which receives the broadcast signal, and output interface 45, which provides the descrambled/decrypted output signal. This embodiment is primarily applicable to digital broadcast television signals (broadcast by any medium), but is equally applicable to any other digital broadcast signal where security is required.

A digital television signal is received by a receiver, processed according to how the signal was received (e.g., satellite, terrestrial, cable) and is demultiplexed from data signals including a control channel. The resultant digital TV signal remains in encrypted form, and is provided to the circuit 30 at interface 43. The TV signal is necessarily encrypted according to an encryption/decryption scheme common to all authorized recipients. This is because there are likely to be millions of recipients, and to broadcast the TV signal using individual encryption schemes would require broadcasting the signal in millions of different encrypted forms simultaneously, and this is simply not feasible. The encrypted TV signal is provided to a DVB unit 38 on internal bus line 51, where it is decrypted in accordance with control data to produce a clear TV signal at the output line 41 to the output interface 45. The clear TV signal is a signal stream that can be converted to picture and sound without further secret cryptographic techniques.

A fixed decryption scheme could be used by using a key common to all users and all channels; however, this would be insecure as if cracked once, the decryption would then be available to all. Accordingly, a changing encryption scheme is used in which an encrypted flow of control words (CW) are broadcast in the control data, which require decryption be provided to the DVB Unit 38. The control words are also encrypted in a manner common to all authorized recipients, otherwise a unique flow of control words would need to be individually provided to each of the millions of recipients, which would again be non-feasible because of bandwidth. The control words are provided in encrypted form via input interface 43 and internal bus 47 to a decryption circuit 32, here an AES circuit. The AES circuit 32 decrypts the control word data and provides it to the DVB unit 38 via an internal bus 31.

The encryption scheme of the control word data flow is the same for all recipients (otherwise the control word data flow itself would differ for each recipient with the bandwidth problem noted above). A Common Key (CK) for the AES circuit 32 is therefore required. The common key is stored in a common key store 36 and provided to the decryption circuit 32 over a line 37. In this embodiment, it is not important how the common key is provided to the common key store. However, for preference, the common key is transmitted to each circuit 30 over the air. In other pending patent applications of the applicant, systems are disclosed for securely updating various keys within the circuit or entitlement rights stored in a rights store.

The main features of the circuit are described as a Hardware Feature Manager (HFM) 60 and are a secret store 62, a decryption circuit 64, a comparator 66 and an enabling circuit 68. The purpose of the hardware feature manager is to either prevent or limit the functioning of the circuit 30 unless a correct unlocking signal is received on line 67. This can be contrasted to prior known techniques which have all relied upon providing conditional access to television signals themselves. In contrast, the present invention allows a device such as a television decoder to be sold to a customer in a "locked" condition (in the sense that it will either not work or only partially work) and the decoder will only be unlocked if the appropriate enabling message is received.

The hardware feature manager 60 operates as follows. Initially, the circuit 30, and hence a television decoder within which the circuit operates, is in a non-functioning or partially functioning state. This is defined by the enabling circuit 68, which includes a hardware fuse arranged so that an area of hardware operation requires the fuse to be "blown" to operate. The fuse is initially in a "non-blown" state when the device containing the circuit is sold to a user.

The enabling device may alternatively comprise a non-volatile memory that can be set and reset so that the functionality of one or more areas can be reversibly enabled or not.

The circuit or some part of it is enabled by receiving an enabling message if the user of the circuit is authorized to operate the circuit. In the case of a PAY-TV device, the user is authorized provided that they have paid for a subscription. A service provider will then provide the appropriate enabling message in encrypted form. On receipt of the enabling message at the interface 43, this is passed to the decryption circuit 64 (here an AES circuit) over the line 67. The AES circuit decrypts the message using a stored secret key to produce a plain text signal of N bytes. The plain text signal is then compared to a fixed value in the secret store 62. If n bytes of the plain text match the fixed value, as determined by the hardware comparator 66, then the enabling circuit 68 is set to allow the circuit 30 to function by blowing a fuse within the enabling device, for example, or setting or resetting a status flag in non-volatile memory. The enabling circuit 68 is set to allow the circuit 30 to function in various ways including switching a hardware switch in a data path or using bytes within the plain text signal that are not matched with a stored value to set one or more fuses or memory values.

Security in the circuit is thus provided in that a user can only operate whole or a portion of the circuit if that circuit has been enabled. The circuit will only be enabled if the user has paid for a subscription so that a service provider provides an enable signal encrypted according to the secret key of the circuit. As the circuit is monolithic in the sense that the hardware feature manager and circuit performing the television signal decryption functions are on the same integrated circuit (semiconductor chip), the circuit is very secure. The only ways to fraudulently use the circuit are to guess at the appropriate unlocking signal (unfeasible using algorithms such as AES) or "brute force" to try and hack the circuit at the hardware level.

Figure 3:
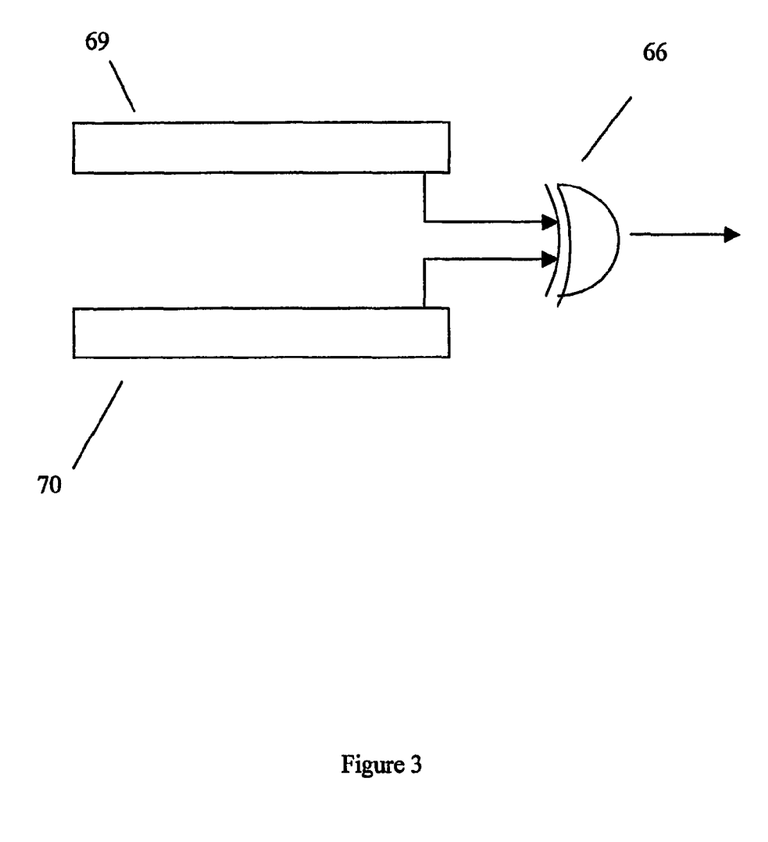
FIG. 3 shows a comparator in more detail.

A portion of the comparator 66 is shown schematically in greater detail in FIG. 3. A first shift register 69 is connected to the value store 62 and receives the stored secret value or message. A second shift register 70 is connected to the AES circuit 64 and receives the decrypted plain text signal and conducts a bitwise comparison by shifting n bytes of the plain text signal into an XOR tree 67. The output of the comparator 66 is a one-bit signal to the enabling circuit 68. In addition, any remaining bytes of the received decrypted plain text signal (N-n) are used to address the enabling circuit 68 to indicate which functions are to be enabled or restricted.

Various alternatives within the embodiment of the invention will now be described, and those portions of the circuit 30 relevant to the respective operation discussed in relation to FIG. 4.

Figure 4:
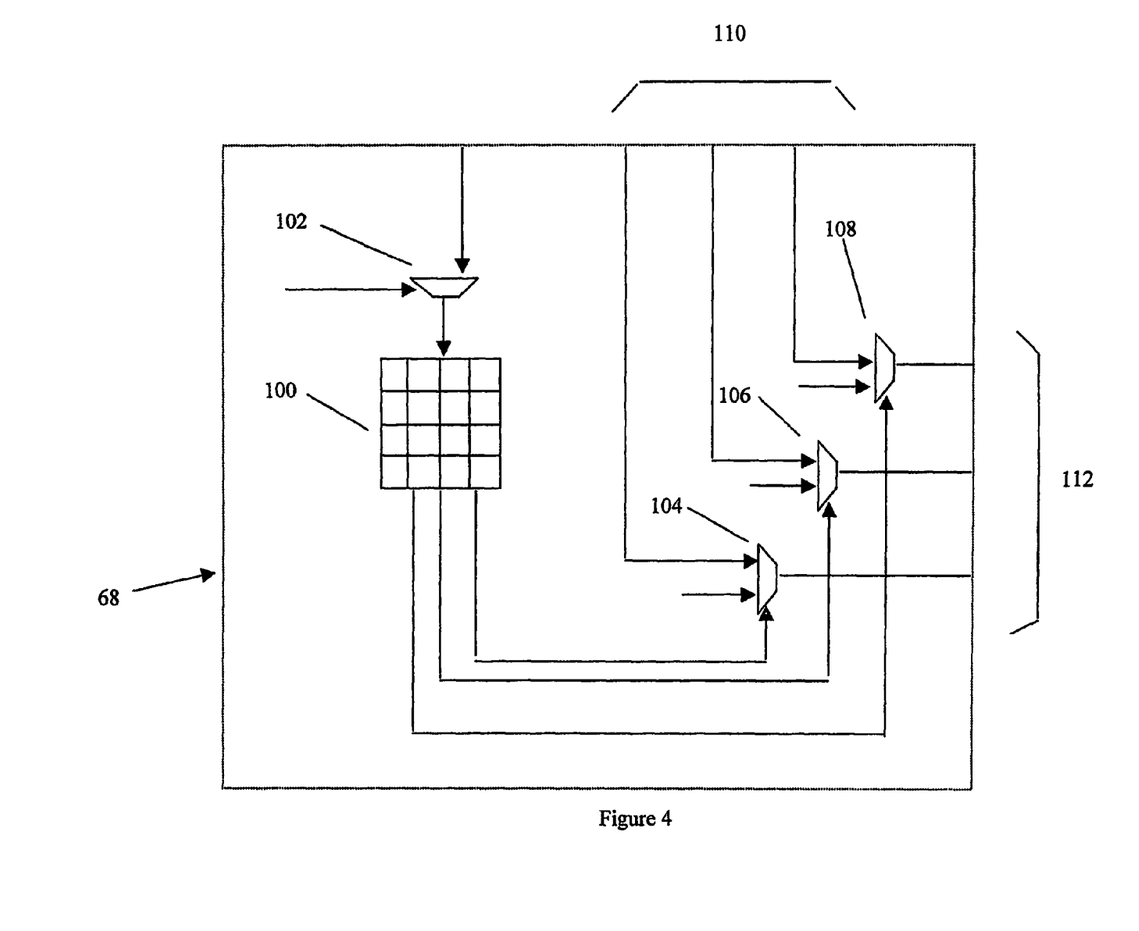
FIG. 4 shows an enable circuit in more detail.

One way in which functionality of a circuit 30 may be allowed or denied is by a switching arrangement within the enabling circuit 68 as shown in FIG. 4. This arrangement can allow or deny operation of portions of the circuit 30 by switching off a critical data pathway. In the embodiment of a television decoder, there are portions of the circuit not shown including an MPEG decoder, display engine and data ports (all not shown), and a cryptographic processor (shown as AES circuit 32 in FIG. 2). A critical pathway into or out of or within one of these circuits could be selectively gated by the enabling circuit 68. The selective interruption of one or more pathways is shown by inputs 110 from one of these portions of the circuit 30 and outputs 112 back to the portion of the circuit effectively creating a gated loop in the pathway. Between the inputs and outputs are multiplexers 104, 106, and 108 which are switched under control of a memory 100. The memory 100 comprises fuses that can be blown once only or memory that can be set and reset. In either case, the setting of the memory 100 is by the enabling message received and decrypted. Within the message, a portion of the bytes may be required to match with the stored secret value, the remainder are used as a message to the memory 100 setting a bit pattern indicating which functions of the circuit 30 are permitted, denied, or restricted in operation. The bit pattern in the memory 100 specifies whether the multiplexers 104, 106, 108 should selectively connect one of the inputs 110 to the corresponding output 112 to complete a pathway, or to connect a fixed, but useless value to the outputs 112 from the second input of each multiplexer.

The affect of switching data pathways, as explained, on different areas of the circuit is as follows. Switching a pathway to or from a MPEG decoder within circuit 30 prevents the whole decoder from decoding received television signals. Accordingly, the circuit will operate only to display data from software within the circuit, for example, a message to the user indicating why they cannot view broadcast signals.

Switching a pathway to the display engine could prevent any display being seen or could render the display unwatchable.

Any of the input or output parts of a television decoder could be blocked in the same way. For example, a USB port to allow peripheral devices to be connected could be blocked, an ATI port for access to a hard disk prevented so that a user cannot record or play television data. The same approach can be adopted to prevent access to DVD, DVD-RW, or other formats of mass content storage media. The blocking of a USB port would prevent devices such as video cameras or still cameras from interacting with the decoder so that, for example, still or video could not be recorded to a hard disk within the decoder or displayed. Other possibilities include impairing the sound production by preventing or restricting sound production, degrading the resolution of a display to standard rather than high definition, or indeed preventing or restricting any functionality of the circuit.

A further way in which the functionality may be impaired is by affecting the operation of the chip clock, in particular the clock for a main CPU within the television decoder. This could be by one of the lines from a clock divider passing via the inputs 110 to outputs 112. Unless enabled by receipt of an enabling message, the appropriate multiplexer will be switched so that the second input connects to the output, and the second input could take a high value so that the clock divider divides the clock to produce a slow clock. The affect of such an impairment is that the whole decoder would still operate but too slowly to be of use to a user to watch television.

The way in which the encrypted enabling message is provided to the circuit 30 is preferably by broadcast over air. The message is sent addressed to the decoder and encrypted so as only to match the secret message stored in that decoder. There are other alternatives for the return path for the encrypted message, including sending a message to the user's mobile telephone for transfer to the decoder by IR, wired or wireless link, sending a PIN number, sending a smart card, or other means of transferring data.

The way in which a device incorporating a circuit according to the invention (particularly a PAY-TV device and a "set-top box") may be used is as follows. A supplier sells a television decoder, for example, a "set-top box" which is not capable of operating to provide all possible user functions because the hardware is configured to prevent or restrict normal operation as described above. To allow the "set-top box" to provide functionality, the user must pay a service provider a subscription to a PAY-TV service. The service provider then broadcasts the enablement signal over air, which is encrypted in accordance with the secret key of the "set-top box". The signal is decrypted to produce the plain text signal, which is compared with a stored signal or value and, if there is a match, the appropriate function or functions are enabled to operate.

This effectively creates a new business model in which a user must pay a subscription to obtain certain functionality of an audio/video device such as a television decoder. As the functionality of devices converge, so that a single device can decode television signals, record television content to long-term storage, run software for games, download and edit content from video and still cameras, the invention may be used to provide a device that is capable of all these functions, but is not enabled to operate them unless a subscription is paid. Such a business model allows a reduction in manufacturing costs and encourages user purchase by allowing the cost of the device to be subsidized by an ongoing subscription. In such a business model, the simplest mechanism for providing enablement messages is broadcast over air, but other routes are possible as already described.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A semiconductor integrated circuit for use in an audio-video device arranged to produce audio-video signals from received encrypted broadcast signals without requiring receipt of one or more transmitted keys, comprising:
   an input interface structured to receive an encrypted enable signal;
   an output interface structured to output audio-video signals;
   one or more hardware circuit portions each structured to process data in relation to the audio-video signals;
   a first decryption circuit structured to receive the encrypted enable signal to decrypt the encrypted enable signal in accordance with a key stored on the integrated circuit and to provide a plain text message without requiring receipt of one or more transmitted keys;
   a memory structured to store a stored value for the circuit;
   an enabling circuit structured to generate an enable signal or a disable signal to selectively restrict, deny, or allow operation of at least one of the one or more hardware circuit portions;
   a common key store structured to store a common key;
   a comparison circuit structured to compare the plain text message with the stored value and to selectively instruct the enabling circuit if the plain text message and the stored value match; and
   a second decryption circuit structured to receive the common key from the common key store in the integrated circuit and to decrypt the received encrypted broadcast signal in response to receipt of the common key and the generation of the enable signal.

2. The semiconductor integrated circuit according to claim 1 wherein the enabling circuit includes one or more switch elements structured to selectively interrupt a data pathway to, from, or within at least one of the one or more of the hardware circuit portions.

3. The semiconductor integrated circuit according to claim 2 wherein the data pathway is a critical data pathway, whereby interruption of the pathway prevents operation of the at least one of the one or more hardware circuit portions.

4. The semiconductor integrated circuit according to claim 2 wherein the at least one of the one or more hardware circuit portions includes a clock, and the data pathway relates to the clock of the at least one of the one or more hardware circuit portions, whereby the clock is structured to run slower than normal in response to an interruption of the data pathway.

5. The semiconductor integrated circuit according to claim 4 wherein the at least one of the one or more hardware circuit portions is a main CPU of the semiconductor integrated circuit.

6. The semiconductor integrated circuit according to claim 2 wherein the at least one of the one or more hardware circuit portions is a display engine structured to cause the video signals at the output interface to be interrupted or impaired in response to interruption of the data pathway.

7. The semiconductor integrated circuit according to claim 2 wherein the at least one of the one or more hardware circuit portions is a data port of the semiconductor integrated circuit that is structured to cease operation in response to interruption of the data pathway.

8. The semiconductor integrated circuit according to claim 1 wherein the input interface is structured to receive the encrypted enable signal from a broadcast signal.

9. The semiconductor integrated circuit according to claim 1 wherein the input interface is structured to receive the encrypted enable signal from a manual input device.

10. The semiconductor integrated circuit according to claim 1 wherein the input interface is structured to receive the encrypted enable signal from another device.

11. The semiconductor integrated circuit according to claim 1 wherein the enabling circuit includes a store structured to store indications of hardware circuit elements to be restricted, denied, or allowed to operate.

12. The semiconductor integrated circuit according to claim 11 wherein the memory includes one or more hardware fuses.

13. The semiconductor integrated circuit according to claim 11 wherein the memory includes a non-volatile memory.

14. The semiconductor integrated circuit according to claim 1 wherein the enabling circuit is structured to extract from the plain text message indications of which hardware circuit elements should be restricted, denied, or allowed to operate.

15. The semiconductor integrated circuit according to claim 1 wherein the semiconductor integrated circuit is a monolithic circuit structured to decrypt the audio-video signals.

16. The semiconductor integrated circuit according to claim 2 wherein the at least one of the one or more hardware circuit portions is structured to store the audio-video signals on an external storage device, whereby the enabling circuit is structured to selectively restrict, deny, or allow storage of the audio-video signals produced by the circuit.

17. The semiconductor integrated circuit according to claim 2, including an input structured to receive broadcast signals from a broadcast network from which the audio-video signals are produced, and wherein the at least one of the one or more hardware circuit portions is structured to produce the audio-video signals, whereby the enabling circuit is structured to selectively restrict, deny, or allow production of the audio-video signals.

18. A television decoder for encrypted broadcast signals, comprising a semiconductor integrated circuit that includes:
an input interface structured to receive an encrypted enable signal;
an output interface structured to output audio-video signals;
one or more hardware circuit portions each structured to process data in relation to the audio-video signals;
a first decryption circuit structured to receive the encrypted enable signal and to decrypt the encrypted enable signal in accordance with a key stored on the integrated circuit prior to reception of the encrypted broadcast signals and to provide a plain text message without requiring receipt of one or more transmitted keys;
a memory structured to store a stored value for the circuit;
a common key store structured to store a common key;
an enabling circuit structured to generate an enable signal or a disable signal to selectively restrict, deny, or allow operation of at least one of the one or more hardware circuit portions;
a comparison circuit structured to compare the plain text message with the stored value and to selectively instruct the enabling device if the plain text message and stored value match; and
a second decryption circuit in the one or more hardware circuit portions and structured to receive the common key from the common key store in the integrated circuit and to decrypt the received encrypted broadcast signal in response to receipt of the common key and the generation of the enable signal.

19. The television decoder of claim 18 wherein the enabling circuit includes one or more switch elements structured to selectively interrupt a data pathway to, from, or within at least one of the one or more of the hardware circuit portions.

20. The television decoder of claim 19 wherein the at least one of the one or more hardware circuit portions has a clock that is structured to run slower than normal in response to interruption of the data pathway.

21. The television decoder of claim 20 wherein the at least one of the one or more hardware circuit portions is a main CPU of the semiconductor integrated circuit.

22. The television decoder of claim 19 wherein the at least one of the one or more hardware circuit portions is a display engine structured to cause the video signals at the output interface to be interrupted or impaired in response to interruption of the data pathway.

23. The television decoder of claim 19 wherein the at least one of the one or more hardware circuit portions is a data port of the semiconductor integrated circuit that is structured to cease operation in response to interruption of the data pathway.

24. A circuit for receiving encrypted broadcast signals and producing audio-video signals therefrom, comprising:
a first decryption circuit structured to store a pre-stored key, to decrypt an encrypted enable signal in accordance with the pre-stored key, and to output a plain text message without requiring receipt of one or more transmitted keys;
a comparison circuit structured to compare the plain text message with a pre-stored value and to selectively output a control signal if the plain text message matches the pre-stored value; and
a second decryption circuit structured to decrypt the encrypted broadcast signals and produce the audio-video signals in response to receipt of a pre-stored common key and the control signal.

25. The circuit of claim 24, comprising an enabling circuit structured to selectively enable, disable, and restrict operation of at least one other circuit in response to the control signal.

26. The circuit of claim 25, wherein the enable circuit is structured to select at least one of a plurality of other circuits in which to selectively enable, disable, and restrict operation in response to the control signal.

27. A method of controlling a circuit for receiving encrypted broadcast signals and producing audio-video signals therefrom, comprising:
decrypting an encrypted enable signal in accordance with a pre-stored key without requiring receipt of one or more transmitted keys and to output a plain text message;

comparing the plain text message with a pre-stored value and selectively outputting an enabling control signal if the plain text message matches the pre-stored value; and decrypting the encrypted broadcast signals and producing the audio-video signals in response to receipt of a pre-stored common key and the enabling control signal.

28. The method of claim 27, comprising of selectively enabling, disabling, and restricting operation of at least one other circuit in response to the control signal.

29. The method of claim 28, wherein selectively enabling, disabling, and restricting operation includes selecting at least one of a plurality of other circuits in which to selectively enable, disable, and restrict operation in response to the control signal.

* * * * *